United States Patent
Labiano Andueza et al.

(10) Patent No.: US 12,506,427 B2
(45) Date of Patent: Dec. 23, 2025

(54) WIND POWER FACILITY AND METHOD

(71) Applicant: Siemens Gamesa Renewable Energy Innovation & Technology S.L., Sarriguren (ES)

(72) Inventors: Daniel Labiano Andueza, Pamplona (ES); Pablo Larrea León, Pamplona (ES); Jesús López Taberna, Pamplona (ES); José Luis Rodriguez Izal, Burlada (ES); Pablo Sanchis Gúrpide, Sarriguren (ES); Alfredo Ursúa Rubio, Pamplona (ES); Javier Sacristán Sillero, Cizur Menor (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 18/288,407

(22) PCT Filed: Apr. 28, 2022

(86) PCT No.: PCT/EP2022/061397
§ 371 (c)(1),
(2) Date: Oct. 26, 2023

(87) PCT Pub. No.: WO2022/229346
PCT Pub. Date: Nov. 3, 2022

(65) Prior Publication Data
US 2024/0204704 A1 Jun. 20, 2024

(30) Foreign Application Priority Data

Apr. 30, 2021 (EP) ...................................... 21382384
May 31, 2021 (EP) ...................................... 21382488

(51) Int. Cl.
*H02P 9/00* (2006.01)
*H02J 3/38* (2006.01)
*H02P 101/15* (2016.01)

(52) U.S. Cl.
CPC .............. *H02P 9/007* (2013.01); *H02J 3/381* (2013.01); *H02J 2300/28* (2020.01); *H02P 2101/15* (2015.01)

(58) Field of Classification Search
CPC ...... H02P 9/007; H02P 2101/15; H02J 3/381; H02J 2300/28; Y02E 10/72; Y02E 10/76
(Continued)

(56) References Cited

U.S. PATENT DOCUMENTS 7,276,807 B2 10/2007 Luetze et al.
7,919,879 B2  4/2011 Flannery et al.
(Continued)

FOREIGN PATENT DOCUMENTS

CN 101 917 156 A 12/2010
CN 106 505 609 A  3/2017
(Continued)

OTHER PUBLICATIONS

International Search Report and Written Opinion for PCT/EP2022/061397, mailed on Sep. 9, 2022.

*Primary Examiner* — Charles Reid, Jr.
(74) *Attorney, Agent, or Firm* — Schmeiser, Olsen & Watts LLP (57) ABSTRACT

A DFIG wind power facility configured to be operated during grid faults is provided. The wind power facility includes a Doubly-Fed Induction Generator, a control system, an electric converter, a short-circuit controlled switch to selectively short-circuit the stator and a Stator Neutral Brake Chopper coupled to the stator. The DFIG includes a rotor and a stator, the stator including at least one three-phase
(Continued)

winding. The electric converter includes a Machine Side Converter, a Grid Side Converter and a DC link connected therebetween. The SNBC includes a three-phase rectifier including three inputs, an impedance and an active high-frequency switch configured to vary the average value of the impedance by adjusting its duty cycle; each of the three inputs of the rectifier is connected to a phase of the at least one three-phase winding of the stator. Methods for operating a DFIG wind power facility during grid faults are also provided.

14 Claims, 9 Drawing Sheets

(58) Field of Classification Search
USPC .................................. 290/7, 46, 44, 55, 50
See application file for complete search history.

(56) References Cited

U.S. PATENT DOCUMENTS

| | | | |
|---|---|---|---|
| 7,939,954 B2 | 5/2011 | Ruiz et al. | |
| 8,198,742 B2 | 6/2012 | Jorgensen et al. | |
| 8,541,898 B2 | 9/2013 | Jorge | |
| 8,742,609 B2 | 6/2014 | Helle et al. | |
| 9,041,234 B2 | 5/2015 | Russel | |
| 9,425,726 B2 | 8/2016 | Kanjiya et al. | |
| 9,667,057 B2 | 5/2017 | Roesner et al. | |
| 10,113,533 B2 | 10/2018 | Menke | |
| 10,243,352 B2 | 3/2019 | Wagoner et al. | |
| 2009/0278354 A1* | 11/2009 | Ichinose | F03D 9/255 290/44 |
| 2011/0187108 A1 | 8/2011 | Wakasa | |
| 2011/0266800 A1* | 11/2011 | Inzunza Figueroa | H02P 9/105 290/44 |
| 2012/0104754 A1* | 5/2012 | Rudolf | H01H 9/547 290/44 |
| 2014/0001756 A1* | 1/2014 | Panosyan | F03D 7/0272 290/7 |

FOREIGN PATENT DOCUMENTS

| | | |
|---|---|---|
| CN | 206 164 111 U | 5/2017 |
| CN | 109617125 A | 4/2019 |
| EP | 2 644 885 A2 | 10/2013 |
| EP | 3 200 331 A1 | 8/2017 |
| EP | 3 276 165 A1 | 1/2018 |
| WO | 03058789 A1 | 7/2003 |

* cited by examiner

WIND POWER FACILITY AND METHOD

CROSS-REFERENCE TO RELATED APPLICATIONS

This application claims priority to PCT Application No. PCT/EP2022/061397, having a filing date of Apr. 28, 2022, which claims priority to European Application No. 21382488.1, having a filing date of May 31, 2021, and European Application No. 21382384.2, having a filing date of Apr. 30, 2021, the entire contents all of which are hereby incorporated by reference.

FIELD OF TECHNOLOGY

The following relates to wind power facilities and methods for operating, more specifically to DFIG wind power facilities and methods for operating during grid faults.

BACKGROUND

Grid faults such as Low Voltage Ride Though (LVRT), voltage dip, voltage drop, grid loss, etc. may seriously affect the operation of a wind power facility. Upon detection of a grid fault, the operation of the wind power facility may usually need to be suddenly changed which requires sudden and fast operation change.

The wind power facility needs to quickly adapt to a new operating mode to face unexpected events such as grid faults, but furthermore, needs to be configured to promptly return back to normal operation mode upon ceasing of the event.

Known methods in DFIG turbines focus on reducing the energy production by slowing down the rotor by braking and/or using the pitch control to modify the blade orientation to reduce the wind impact surface. Thus, all the kinetic energy is dissipated through mechanical components thereby introducing high mechanical loads and stresses into the wind power facility. Consequently, the lifetime of the facility is reduced and/or the risk of failure increases.

In conclusion, there is a need to provide a DFIG wind power facility with optimized performance during grid faults which increases the efficiency in a cost-effective way while at the same time enables safe operation.

SUMMARY

An aspect relates to a DFIG wind power facility configured to operate during grid faults is provided. The DFIG wind power facility comprises a Doubly-Fed Induction Generator (DFIG), a control system configured to manage the operation of the DFIG wind power facility, an electric converter, a short-circuit controlled switch configured to selectively short-circuit the stator thereby allowing the current to flow through the stator upon decoupling the grid from the stator and a Stator Neutral Brake Chopper (SNBC) coupled to the stator. The Doubly-Fed Induction Generator comprises a rotor and a stator, wherein the stator comprises at least one three-phase winding and the phases of the at least one stator three-phase winding are connected to grid at one end and to the SNBC at the other end. The electric converter comprises a Machine Side Converter (MSC), a Grid Side Converter (GSC) and a DC link connected therebetween. The SNBC comprises a three-phase rectifier comprising three inputs, wherein each input corresponds to a phase: an impedance and an active high-frequency switch configured to vary the average value of the impedance by adjusting its duty cycle: wherein each of the three inputs of the rectifier is connected to a phase of the at least one three-phase winding of the stator. During a fault, the at least one stator three-phase winding is configured to remain connected to the grid.

The use of the SNBC may enable bypassing the energy produced by the blades to mitigate the mechanical transients that appear during a grid fault. Thus, the lifetime of the wind power facility may be extended or at least prevented from a premature wear.

The flux variation on the stator due to voltage transients may cause large overcurrent and/or overvoltage that may lead to lose the control of the wind power facility. The addition of a SNBC enhances the control over the wind power facility and enables controlling the torque.

The use of an impedance enables dissipating the power extracted from the wind and which cannot be introduced into the grid, e.g., due to a voltage dip, as the current that was previously circulating towards the grid can flow through the impedance. The stator may thus generate reactive power in despite a grid fault, and therefore, a sudden operation change, i.e., the use of a mechanical braking to suddenly stop the wind power facility operation: is not needed, and the energy generation capacity of the stator may be maintained.

In case of a voltage dip, the impedance enables a quick damping of the flux variations in the stator thereby reducing the overvoltage and/or overcurrent in the rotor at the beginning of the dip. The control over the wind power facility may thus be improved and/or made easier (when compared to preexisting conventional art devices) as the voltage and current do not suffer big oscillations.

In addition, by being able to vary the average value of the impedance by adapting the duty cycle of the high-frequency switch, the energy dissipated by the impedance may be adjusted and/or adapted according to ongoing circumstances. Indeed, the high frequency switch enables the impedance to switch from null value to a non-null value very fast e.g., in micro-seconds, thereby achieving a modulable impedance average value.

Moreover, by being able to vary the average value of the impedance, a controlled electromagnetic torque may be obtained e.g., during a voltage dip. The generator speed may therefore not suffer big oscillations which may be useful for further improving or facilitating the control of the wind power facility.

In addition, varying the average value of the impedance may increase the adaptability of the wind power facility as enables taking into account the specific features e.g., the depth of the LVRT, the length of the LVRT, etc. because the energy to be dissipated may be adapted to the features of the on-going event. As a result, the electromagnetic torque during a grid event, e.g., a dip, may be almost constant, up to rated value or within the electrical system limits. Therefore, the DFIG wind power facility may, upon recovery of nominal grid voltage value, be able to deliver the reference power to the grid almost as fast as a full converter wind power facility. Otherwise, the electric system should be dedicated to damp the mechanical transient which would delay the return to normal operation. A more versatile wind power facility may thus be obtained.

The use of a short-circuit controlled switch enables short-circuiting the stator thereby enabling a continuous flow of the electrical energy through the stator during a grid fault. Moreover, the wind power facility may not need to be suddenly slowed down, i.e., may continue almost under normal operation, which facilitates the return to normal operation after ceasing of the grid fault.

In addition, when short-circuiting the stator, the DFIG wind power facility may mimic the operation of a Full Converter (FC) during grid faults. FC wind power facilities are known to be more mechanic friendly, i.e., they avoid and/or prevent excessive mechanical loads during grid fault and also have enhanced ability to recover the normal operation after the grid event e.g., grid fault. Therefore, when the grid fault ceases, the nominal energy production may be faster reached, and the wind power facility may recover the normal DFIG operation mode in a cost-effective way.

By providing a DFIG wind power that may under certain circumstances, e.g., during grid faults, be configured to behave as a FC, the efficiency of the wind power facility may be increased as it may not be necessary to drastically modify the normal functioning of the wind power facility. Moreover, a DFIG wind power facility has a lower manufacturing costs than a FC wind facility, and therefore, by configuring the DFIG wind power facility to operate during grid faults, some advantages of FC may be obtained but avoiding high manufacturing costs of a FC facility.

Furthermore, as the rotor of the wind power facility may be slowed down via power dissipation, mechanical stresses added by the mechanic braking system may be prevented, the lifetime of the wind power facility may therefore be increased.

In addition, the at least one SNBC and the short-circuit controlled switch may easily be installed e.g., in already operating turbines.

The use of a short-circuit controlled switch allows operating the DFIG as motor which enables rotating the blades in absence of wind which may be useful e.g., for maintenance tasks and also to facilitate the erection of the wind power facility e.g., for placing the blades in place. When closing the short-circuit controlled switch energy may be taken from the grid through GSC.

In an example, the short-circuit controlled switch may be an electromechanical switch or an electronic switch. An electronic switch may provide a quicker switching, e.g., in microseconds, if compared with electromechanical switches. Alternatively, the electromechanical switches are more efficient and cheaper than electronic ones.

In an example, the three-phase rectifier may comprise at least one thyristor e.g., a phase-controlled thyristor.

The use of at least one thyristor enables lowering the start-up speed of the DFIG wind power facility to Full Converter start-up value, i.e., from about 60% of the nominal speed about a 30% of the nominal speed, which results into an increased energy production of the DFIG wind power facility.

Besides, the voltage applied to the stator, e.g., in case of low wind speeds, may also be decreased thereby the voltage induced in the rotor will be below the maximum value that the converter may supply. Thus, the control over the DFIG operation may be enhanced and, as a result, a higher energy production may be obtained.

By using the at least one thyristor, the switching on (or the connection) of the SNBC may be controlled. The SNBC may be selectively switched on and off e.g., depending on the ongoing situation. Furthermore, a stator-grid switch may not be required when using at least one thyristor in the three-phase rectifier, a cost reduction may thus be achieved.

In addition, by controlling the phase angle of the at least one thyristor the connection or switching on of the entire wind power facility may be managed. For example, when the at least one thyristor is turned off the stator is an open circuit and cannot receive the grid voltage.

In an example, the three-phase rectifier may comprise a plurality of thyristors connected in series and/or in parallel. For example, a thyristor bridge may be provided which enables operating the DFIG generator as motor to be implemented in absence of wind, as aid during the erection of the wind power facility e.g., to place the blades in place and/or during maintenance tasks. If used for maintenance task the duration of the maintenance may be substantially reduced. The thyristors may also enable a smooth starting of the motor.

Moreover, the use of a plurality of thyristors may enable working at low speeds conditions, e.g., at about 30% below synchronous speed of the wind power facility, thereby the efficiency at low wind speed may be improved.

In an example, the three-phase rectifier may comprise at least a diode.

In an example, the three-phase rectifier may comprise a plurality of diodes connected in series and/or in parallel.

In an example, the DFIG wind power facility may further comprise a stator-grid switch for selectively coupling/decoupling the stator and the grid.

In an example, DFIG wind power facility may comprise two or more SNBCs which provides enhanced reliability as, in case of failure of an SNBC, the wind power facility may rely on other(s) SBNC(s). In addition, the wind power facility may be more easily adapted to each grid code requirements which optimizes the costs as there is no need to design a configuration for each installation point, a more adaptable and versatile wind power facility may be provided.

Besides, the costs may be reduced as standard components e.g., impedances, electronic devices, etc.; may be used to manufacture the wind power facility.

In addition, the use of two or more SNBC increases the functionality and the reliably of the wind power facility.

In an example, the two or more SNBCs may be connected in parallel to the at least one winding of the stator the number of SNBCs that may be arrange may thus be increase e.g., to increase the amount of power to be dissipated by the SNBC.

In an example, the stator may comprise a plurality of three-phase windings and the two or more SNBCs may be connected to a different three-phase winding of the stator or a combination thereof. By connecting the SNBCs in series enables reducing synchronization problems that may arise during LVRTs having different durations or during subsequent LVRTs as the SNBC load imbalance may be prevented.

In an example, the DFIG wind power facility may further comprise an Energy Storage System (ESS) in the DC link which enables storing the energy produced during grid faults. Thus, upon restoring the grid connection, the energy may be injected into the grid preventing the loss of the generated power.

Additionally, the variability of the power injected to the grid may be substantially reduced as the power injected may not depend on the wind transients. In addition, the power injected to the grid may be limited to a pre-established maximum value e.g., during transient events. The pre-established value may depend on the grid requirements and the capability of the wind power facility.

Moreover, the use of an ESS enables reducing the mechanical loads in case of variable winds as it enables operating under constant torque in the generator and constant power in the grid. The lifetime of the wind power facility may thus be extended.

Besides, the ESS may provide an additional electromagnetic torque that can balance the input mechanical torque e.g., during grid transients, such electromagnetic torque being generated absorbing the energy harnessed from the wind and storing it in the ESS.

The use of ESS may allow operating the DFIG as motor in case of grid loss as the stored energy may be used to move the rotor. The maintenance operations may be carried out in case of grid loss.

In an example, the ESS may comprise a plurality of batteries in series and/or in parallel. The value of the charge capability and voltage of the ESS may therefore be optimized.

In an example, the ESS may be connected in parallel to the DC link capacitor which prevents losing control over the wind power facility as at sub-synchronous speed, the power flowing into the rotor is provided by the ESS; and at super-synchronous speed, the ESS may absorb the generated power before it reaches the Grid Side Converter thereby supporting the control of the wind power facility and avoiding losing such generated energy that can be injected into the grid after the event.

In a further aspect, a method for operating, e.g., for shutting down, a DFIG wind power facility 1 in case of a grid loss in a controlled manner is provided.

Firstly, the grid connection is monitored. Upon detecting a grid loss, the short-circuit controlled switch is closed and at least the stator is decoupled from the grid (by opening the stator-grid switch. The pitch of the plurality of blades is increased. The active high-frequency switch of the at least one SNBC is then opened, and the impedance may thus dissipate the power from the stator and the rotor speed is progressively and/or gradually reduced without requiring sudden braking which introduces mechanical loads.

The rotor speed is measured and a predetermined DC or AC current is injected into the rotor thereby adapting the rotor frequency. The rotor is measured and, upon measuring a rotational rotor speed below a predetermined shutdown speed e.g., about 50-100 rpm for a generator having a synchronous speed of about 1500 rpm, the short-circuit controlled switch is opened.

By using such a method, a secure shutdown of the wind power facility may be achieved while mechanical loads may be (substantially) reduced the as the speed of the rotor may be gradually or progressively decreased i.e., the use of a braking system (which introduces high mechanical loads into the wind power facility components) is avoided.

The lifetime of the wind power facility may thus be extended, and the maintenance tasks reduced.

BRIEF DESCRIPTION

Some of the embodiments will be described in detail, with reference to the following figures, wherein like designations denote like members, wherein.

DETAILED DESCRIPTION

The term "wind power facility" shall be understood as a wind turbine or as a plurality of wind turbines.

The term "connected/coupled to the grid" shall be understood as either a direct connection of a wind power facility and the electrical grid, or, in case of a wind power facility located at a wind farm an indirect connection.

The terms "connected" and "coupled" shall be considered synonyms and are interchangeably used herein. Similarly, the terms "disconnected" and "uncoupled" shall be considered synonyms and are interchangeably used herein.

The term "Grid Side Converter (GSC)" shall be understood as the part of an electric converter facing or coupled to an electrical grid. Such connection may be direct or have an intermediate device e.g., a common coupling point of several wind power facilities of a wind farm which centralizes the contributions of a plurality of facilities.

The term "normal operation" shall be understood as the usual running of a wind power facility in absence of unexpected events such as grid faults.

The term "grid fault" shall be understood as a plurality of electric phenomena e.g., voltage dip, grid loss, etc., that may affect the normal functioning of a wind power facility. The term "Low Voltage Ride Though (LVRT)" shall be understood as the generator capability to stay connected during a short period of low electric network voltage.

The term "voltage dip or voltage drop" shall be understood as a short duration abrupt reduction of grid voltage.

The term "grid loss" shall be understood as a sudden decoupling of the wind power facility from the grid.

The term "circuit branch" shall be understood as an electrical path between two circuit nodes wherein each branch may comprise a single element or a plurality of elements arranged in series.

The term "duty cycle of a high-frequency switch" shall be understood as the ratio of time a high-frequency switch is switched on compared to the time the high-frequency switch is switched off. The variation of the switching frequency and/or of the duration of each pulse of a high-frequency switch may enable changing and/or adapting the average value of an impedance connected thereto.

Figure 1:
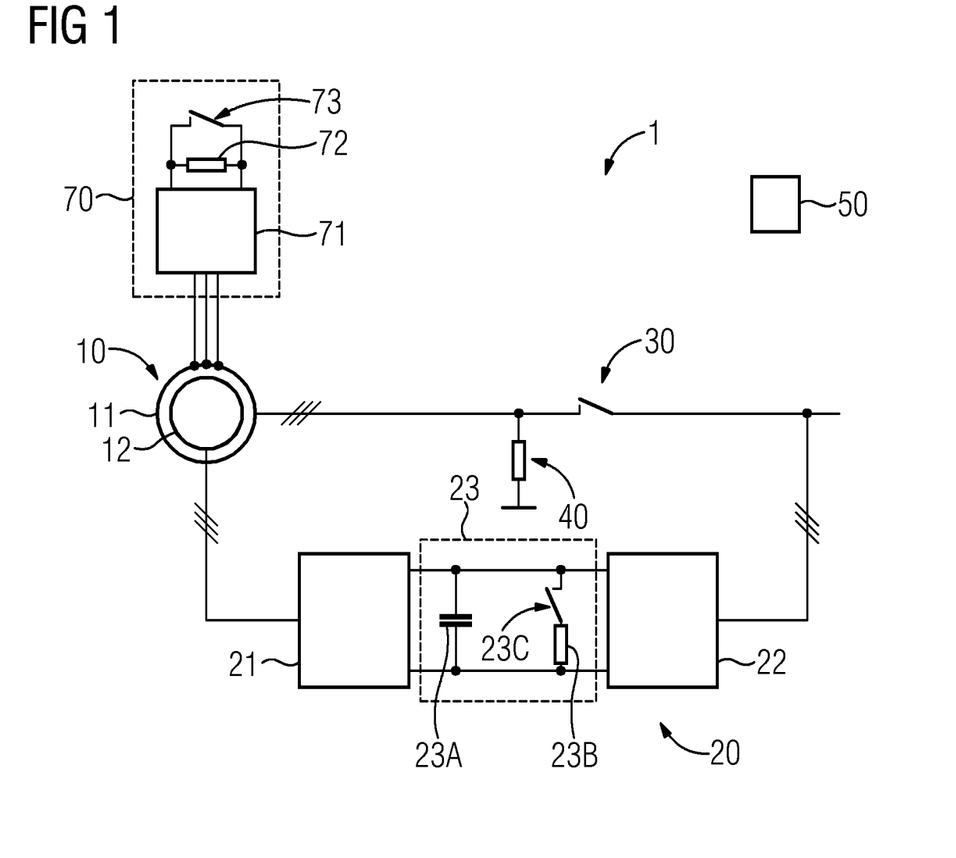
FIG. 1 schematically illustrates a DFIG wind power facility according to an example.

FIG. 1 depicts part of a wind power facility 1, e.g., a wind turbine, according to an example. The wind power facility 1 may be configured to operate during grid faults such as grid loss.

The wind power facility 1 may comprise a Doubly-Fed Induction Generator (DFIG) 10 that may comprise a stator 11 and a rotor 12. The stator 11 may comprise at least one three-phase winding (not shown). In other examples, the stator 11 may comprise two or more three-phase winding. The three-phase winding(s) may be configured to remain connected to the grid during a grid event e.g., a grid fault. The wind power facility 1 may also comprise a plurality of blades (not shown) connected to the rotor via a hub in order to mechanically transmit the received wind power to be transformed it into electric power.

The wind power facility 1 may further comprise a converter 20 which may comprise a Machine Side Converter (MSC) 21, a Grid Side Converter (GSC) 22 and a DC link 23 coupled therebetween. The DC link 23 may comprise a switch 23C in series with a resistor 23B. The switch 23C and the resistor 23B may be arranged in parallel to a capacitor 23A. Besides, the SGC may comprise a switch configured to decouple de GSC from the grid.

In an example, the capacitor 23A may be e.g., an electrolytic capacitor, having a capacitance order around e.g., dozens of mF. In an example, the resistor 23B may have a resistance of e.g., around 1 mΩ, with a capacity of dissipating e.g., dozens of MJ.

In addition, the wind power facility 1 may comprise a short-circuit controlled switch 40. The short-circuit controlled switch 40 may comprise an end coupled to the stator and another end coupled to ground. The short-circuit controlled switch 40 may be configured to selectively short-circuit the stator. Therefore, upon closing the short-circuit controlled switch 40, the current may flow from the stator.

The short-circuit controlled switch 40 may comprise at least a controllable switch (not shown) configured to open/close the electric connection between the stator and the ground connection. The controllable switch may be an electromechanical switch, e.g., a contactor: or an electronic switch e.g., a thyristor, an Insulated Gate Bipolar Transistor (IGBT) or any other suitable device.

The wind power facility may further comprise a control system 50 which may be configured to manage and control the operation of the wind power facility. The control system may send control signals, e.g., wired or wirelessly, to the components of the wind power facility e.g., the converter. The control system may be configured to implement or carry out any method described herein. The control system 50 may also be the converter control system.

The DFIG wind power facility 1 may further comprise a Stator Neutral Brake Chopper (SNBC) 70 coupled to the stator 11. The SNBC may be configured to dissipate the power generated by the stator during a grid fault. The SNBC 70 may comprise a three-phase rectifier 71, an impedance 72 and an active high-frequency switch 73. In such cases, the stator three-phase winding(s) may be coupled to grid at one end and to the SNBC at the other end.

The impedance 72 may be configured to dissipate the energy produced in the stator e.g., during a grid fault, and therefore enable a controlled shut down. Being able to slow down the wind power facility with power dissipation may prevent introducing high mechanical loads to the mechanic components thereby providing a controlled and safe shut down (without using mechanical braking). In an example the impedance 72 may be a resistor.

The active high-frequency switch 73, e.g., an IGBT transistor or any other suitable device, may be configured to be selectively open/close in case a grid fault is detected. For example, during normal operation the active high-frequency switch 73 may be configured to be closed. Upon detection of a grid fault, e.g., via the control system, the active high-frequency switch 73 may be configured to open and therefore, the current from the stator may pass through the impedance for dissipating the The three-phase rectifier 71 that may have three inputs, i.e., an input per each of the three phases of the three-phase current/voltage. Each of the three inputs of the three-phase rectifier 71 may be connected to a phase of the at least one three-phase winding of the stator. The three-phase rectifier 71 may be configured to enable the stator neutral point with a single high-frequency switch.

The three-phase rectifier 71 may comprise at least a diode. In such cases, the SNBC may comprise a commutation aid circuit, e.g., a Snubber, for loss reduction. In other examples, the three-phase rectifier 71 may comprise a plurality of diode connected in series and/or in parallel.

In addition, in examples wherein the three-phase rectifier 71 comprises at least a diode, the wind power facility 1 may further comprise a stator-grid switch 30 for selectively coupling/decoupling the stator and the grid. The stator-grid switch 30 may comprise an end coupled to the stator and the other end coupled to the grid.

The short-circuit controlled switch 40 and the stator-grid switch 30 may be configured to be opened alternately, i.e., not simultaneously. That is, during normal operation the stator-grid switch 30 may be configured to be closed, and thus, the stator current can flow into the grid. The short-circuit controlled switch 40 may, during normal operation, be configured to be open.

In the event of a grid fault, i.e., upon detection of a grid event, the stator-grid switch 30 may be configured to be opened and the short-circuit controlled switch 40 may be configured to be closed.

The three-phase rectifier 71 may comprise at least one thyristor. In an example, the three-phase rectifier 71 may comprise a plurality of thyristors connected in series and/or in parallel.

In examples wherein the three-phase rectifier 71 comprises at least one thyristor the wind power facility 1 may comprise additional functionalities such as a controlled shutdown operation in case of a grid fault, e.g., grid loss. Additionally, the wind power facility 1 may have an enhanced capability to operate under low wind speeds.

In examples wherein the three-phase rectifier 71 comprises at least one thyristor the stator-grid switch 30 may not be required as the at least one thyristor may function as switch preventing the current through the stator to flow i.e., reach the grid.

Figure 2:
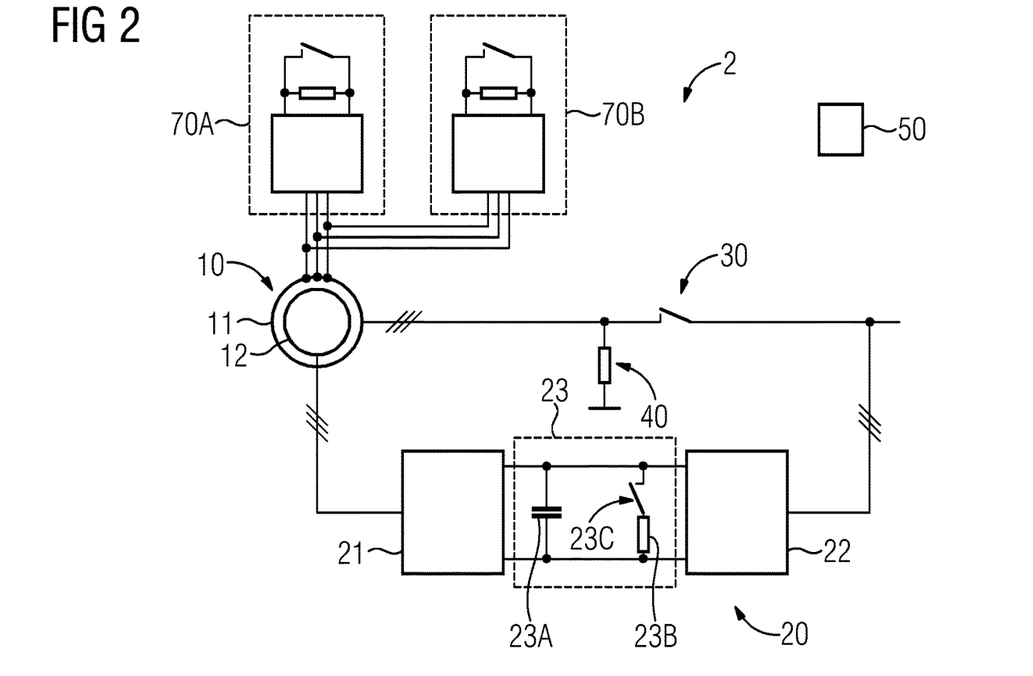
FIG. 2 schematically illustrates a DFIG wind power facility according to an example.
Figure 3:
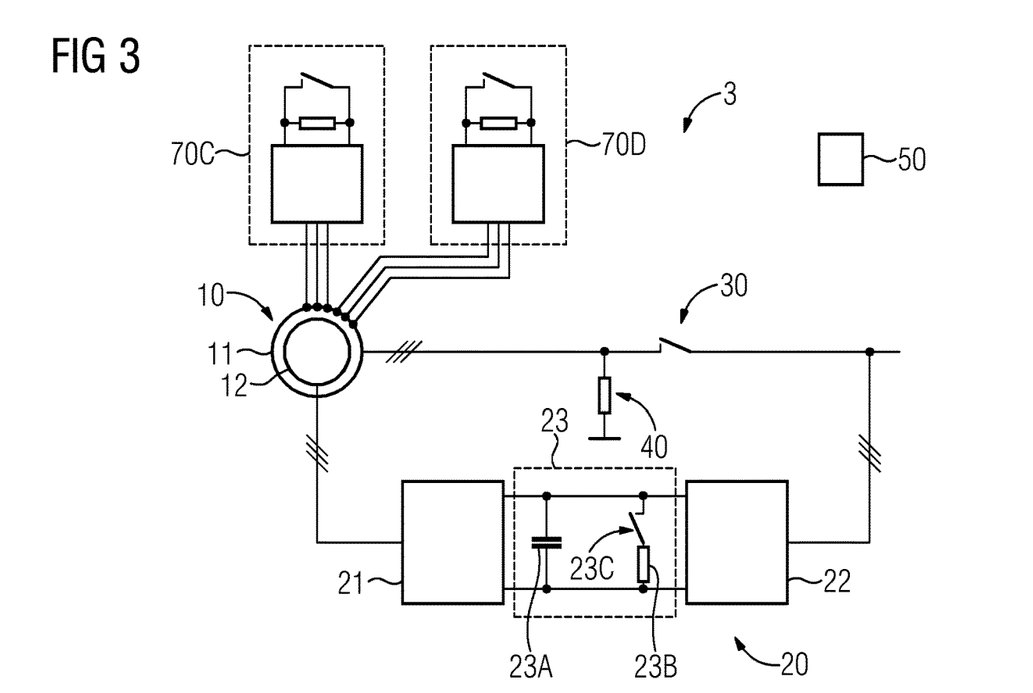
FIG. 3 schematically illustrates a DFIG wind power facility according to an example.

Although FIG. 1 depicts a DFIG wind power facility 1 comprising a single SNBC, the DFIG wind power facility may also comprise a plurality of, i.e., two or more, SNBCs according to any of the disclosed examples (see FIGS. 2 and 3). The number of SNBCs may depend for example on the number of poles of the generator. In an example, the number of SNBC(s) may be equal to the number of poles of the generator. The number of SNBCs may not be greater than six. In an example, the wind power facility 1 may comprise three SNBCs.

In examples comprising two or more SNBCs, different configurations may be possible: the plurality of SNBCs may be arranged therebetween in parallel, each in series with a stator winding or in a combination thereof.

FIGS. 2 and 3 show examples of two possible configurations of a wind power facility 2, 3 comprising two SNBCs 70A-70D arranged in parallel therebetween and in series with a stator winding, respectively.

FIG. 2 shows a wind power facility 2 comprising two SNBCs 70A, 70B according to any of the disclosed examples arranged in parallel therebetween. The inputs of the three-phase rectifiers may be coupled to the same three-phase winding of the stator. Being able to arrange the SNBCs in parallel may enable coupling a higher number of SNBCs e.g., to enable a greater power dissipation.

FIG. 3 depicts a wind power facility 3 comprising two SNBCs 70C, 70D according to any of the disclosed examples, wherein each SNBC may be arranged in series with a stator winding. The three-phase rectifier of each SNBC may have the three inputs coupled to a different three-phase winding of the stator, therefore the stator may comprise two or more three-phase winding.

LVRTs having a different duration or even subsequent LVRTs may cause SNBC load imbalance and consequently synchronization problems. By connecting the two or more SNBCs in series with a respective stator winding such synchronization problems may be prevented.

Figure 4:
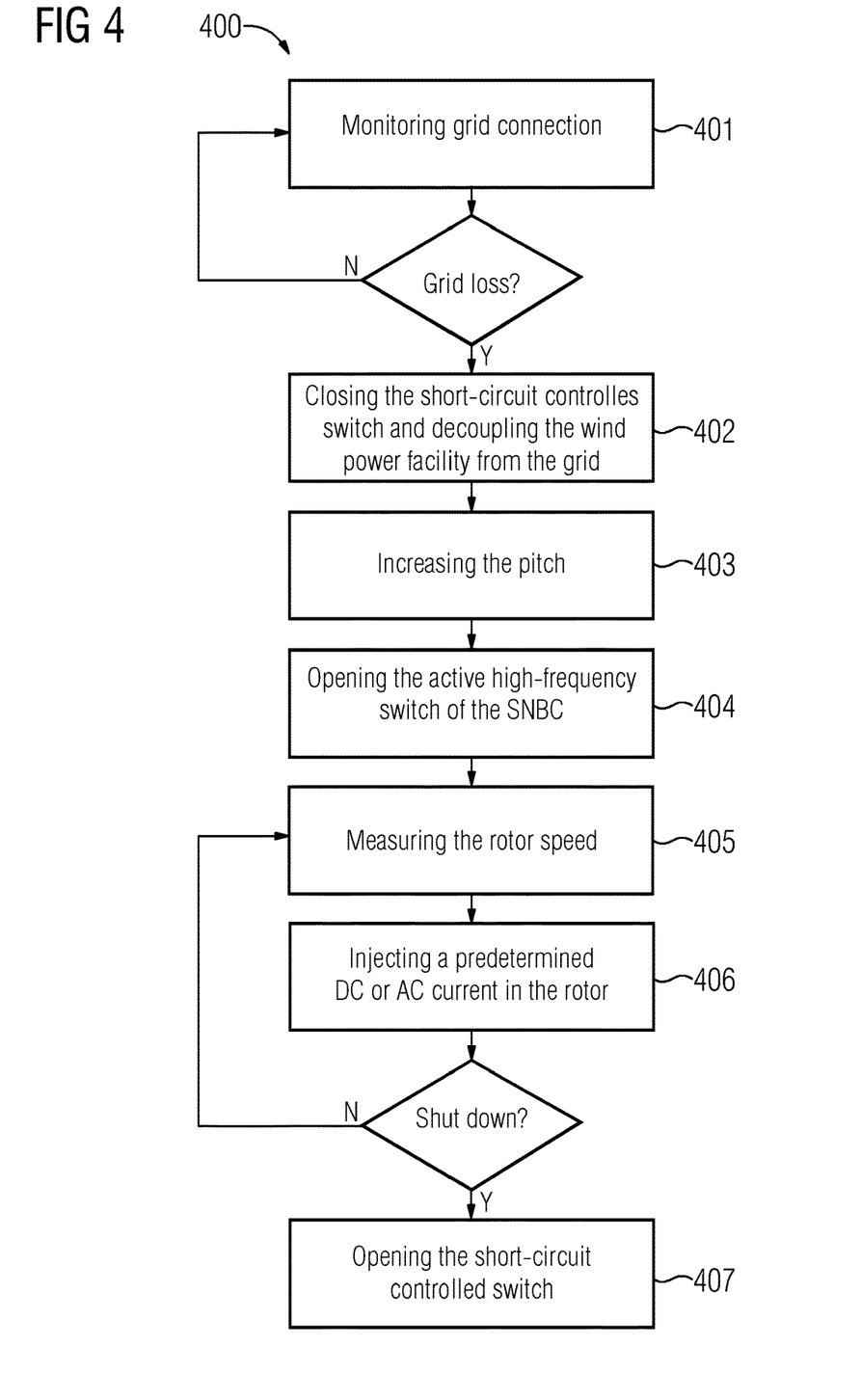
FIG. 4 schematically illustrates a flow diagram of a method for operating a DFIG wind power facility during grid loss according to an example.

FIG. 4 depicts a flow chart of a method 400 for shutting down a DFIG wind power facility 1 in case of a grid fault, e.g., a grid loss, in a controlled manner. In embodiments, the method 400 may be implemented by a DFIG wind power facility 1 according to any of the disclosed examples.

Firstly, the grid connection may, in block 401, be monitored. Such monitoring may be carried out at the common coupling point by e.g., converter grid voltage controller or any other suitable device. In the event of a grid loss is detected, the wind power facility may or at least the stator may (as GSC may have its own switch or switches) be decoupled from the grid e.g., by using a stator-grid switch (in examples wherein the three-phase rectifier comprises at least a diode) or by a switch arranged at the grid side (not shown) and the short-circuit controlled switch may, in block 402, be closed. The pitch of the plurality of blades may, in block 403, be increased by e.g., up to a shutdown position, for instance to 90 degrees. Therefore, the wind power facility may decrease the rotation speed of the blades, i.e., of the rotor, progressively.

The active high-frequency switch of the SNBC(s) may, in block 404, be opened. The impedance(s) may thus dissipate the power from the stator and the rotor speed is progressively and/or gradually reduced without requiring sudden braking which introduces mechanical loads. In an example, the duty cycle of the active high-frequency switch may be varied so it may be switched, i.e., open/closed, repeatedly, to adjust the power dissipated in the impedance.

The rotor speed may then, in block 405, be measured. A predetermined DC or AC current may, in block 406, be injected into the rotor thereby adapting the rotor frequency. The predetermined current may depend on e.g., the generator speed, number of poles of the generator and/or generator rated frequency. In an example, almost a pure DC current may be injected. In another example, the predetermined current may be a combination of DC and AC currents within the operation rotor current limits.

The rotor speed may then be measured and, upon measuring a rotational rotor speed below a predetermined shutdown speed e.g., about 50-100 rpm for a generator having a synchronous speed about 1500 rpm the short-circuit controlled switch may, in block 407, be opened e.g., at a current close to zero.

In embodiments, the method 400 allows a secure shutdown of the wind power facility while also reducing the mechanical loads as the speed of the rotor may be gradually or progressively decrease i.e., avoiding the use of a braking system which introduces high mechanical loads into the wind power facility components.

The lifetime of the wind power facility may thus be extended, and the maintenance tasks reduced.

Figure 5:
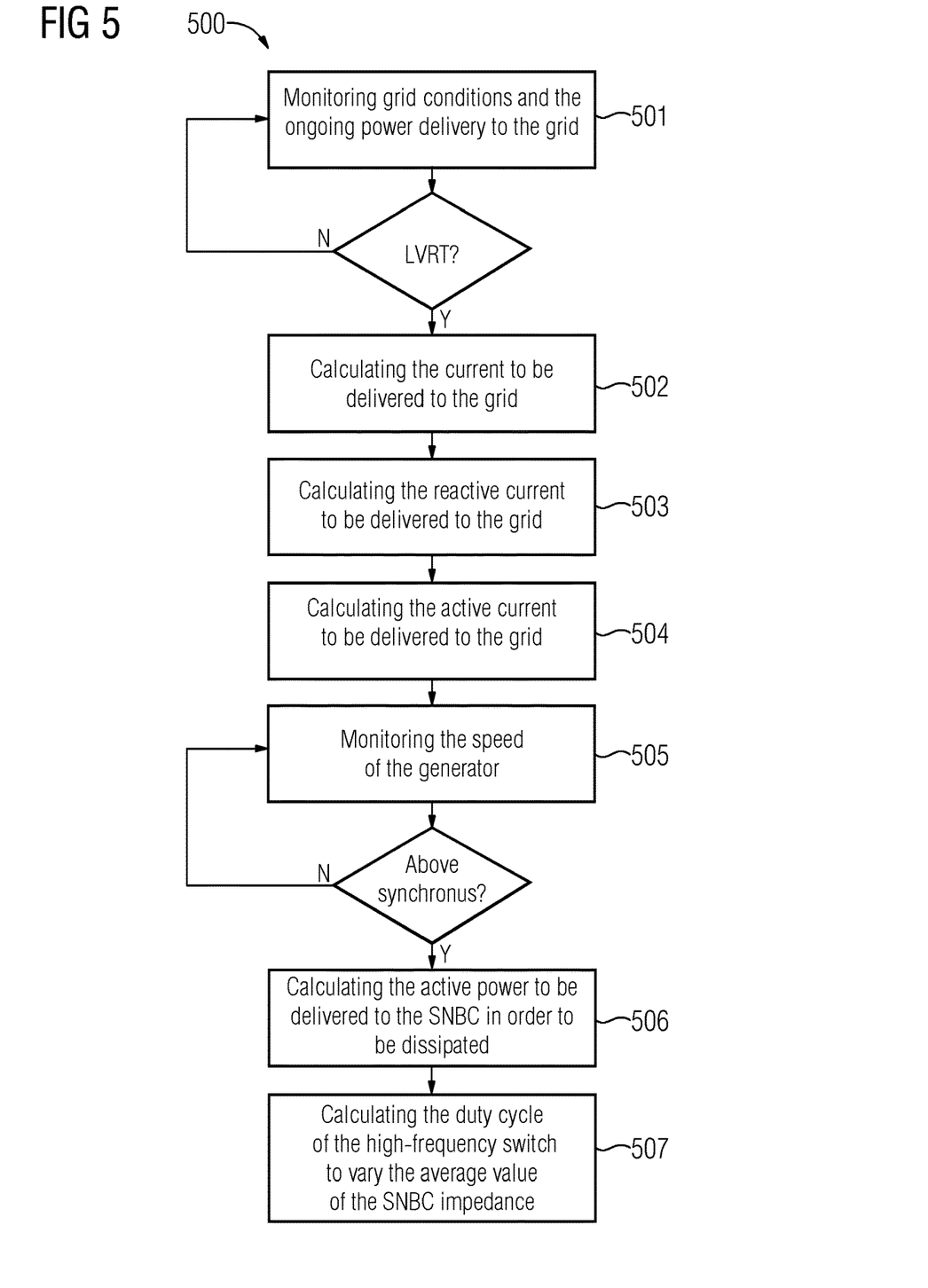
FIG. 5 schematically illustrates a flow diagram of a method for operating a DFIG wind power facility during LVRT according to an example.

FIG. 5 depicts a flow chart of a method 500 for operating a DFIG wind power facility according to any of the disclosed examples during a LVRT condition or event.

Firstly, the grid connection and the ongoing power delivery to the grid may, in block 501, be monitored. Such monitoring may be carried out at the common coupling point by e.g., converter grid voltage controller or any other suitable device. In the event of a Low Voltage Ride Through (LVRT) is detected, the current to be delivered to the grid may, in block 502, be calculated. The current to be delivered to the grid may depend on the depth of the ongoing LVRT.

On the contrary, in the event no LVRT is detected, the grid conditions may continue being monitored.

The reactive current to be delivered may, in block 503, be calculated. Then, the active current to be delivered may, in block 504, be calculated.

The generator speed may, in block 505, be measured, and upon measuring a speed above synchronous speed, the active power to be deviated to the SNBC i.e., to be dissipated by the impedance may, in block 506, be calculated. That is, if the amount of power generated by the wind power facility exceeds the amount the grid may receive, a portion of the generated amount may be dissipated at the impedance of the SNBC. In an example, the active power to be deviated to the SNBC may be calculated as the difference between the active power generated before the LVRT detection and the active power to be delivered to the grid.

The duty cycle of the high-frequency switch may, in block 507, be calculated to vary the average value of the SNBC impedance and effectively dissipated the "extra" or the surplus active power. The impedance may thus dissipate the calculated power.

By being able to vary the average value of the impedance of the SNBC, the wind power facility may be adapted to the ongoing LVRT and its depth or length, and may effectively dissipate the required amount of active power. The value of such impedance may be adapted to obtain a constant torque that avoids mechanical transients.

Figure 6:
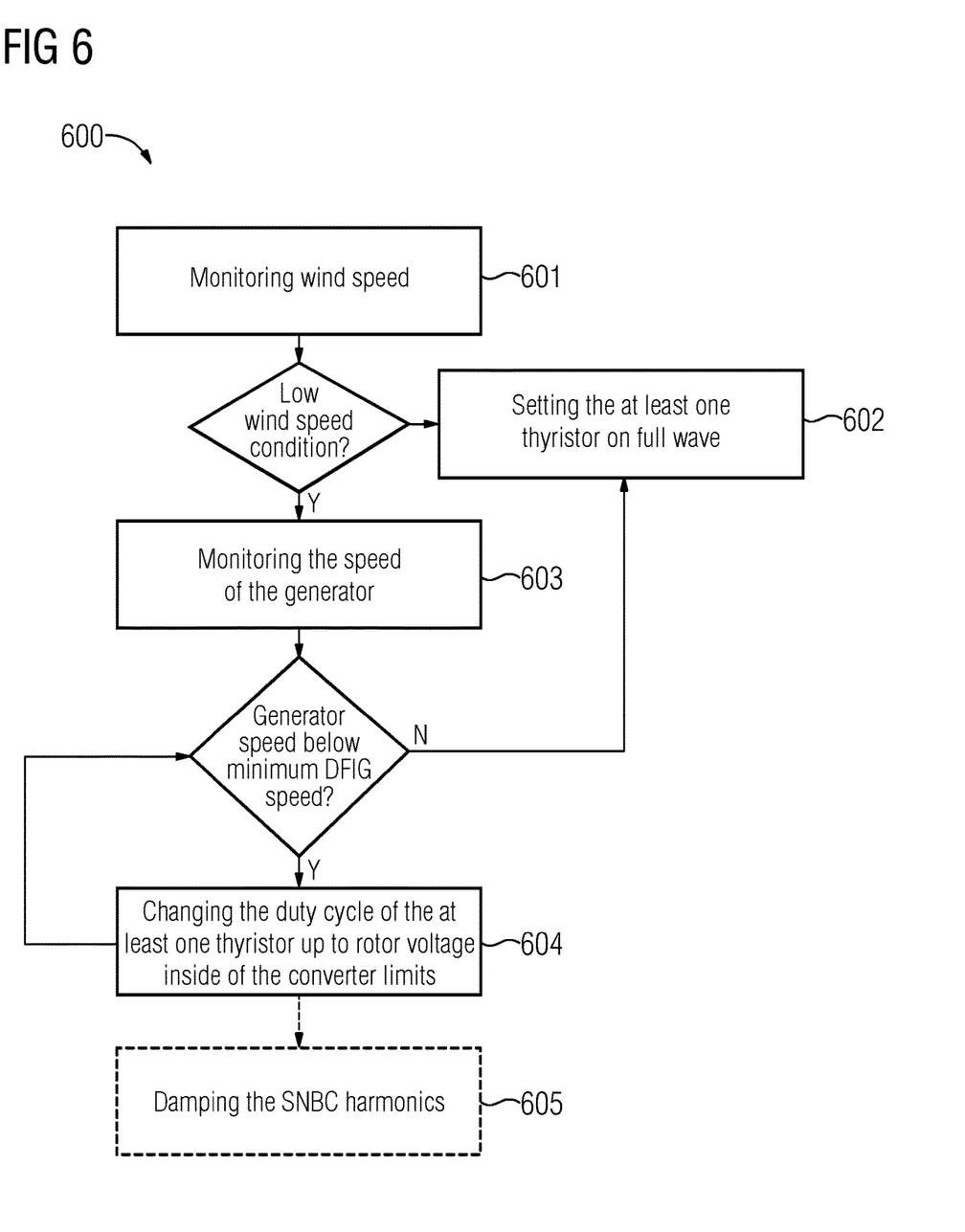
FIG. 6 schematically illustrates a flow diagram of a method for operating a DFIG wind power facility during low wind speed condition according to an example.

FIG. 6 depicts a flow chart of a method 600 for operating a DFIG wind power facility 1 under low wind speed condition. The wind power facility 1 may be a wind power facility according to any of the disclosed examples, wherein the three-phase rectifier of the SNBC may comprise at least one thyristor.

During the operation of the wind power facility, the wind speed may, in block 601 be monitored e.g., by a sensor, an anemometer or by any other suitable device, in order to detect a low wind speed condition e.g., a wind speed below 3-5 m/s. In case a low wind speed condition is not detected the at least one thyristor may, in block 602, be set to full wave mode, i.e., continuously switched on, and therefore the wind power facility may operate under (normal) DFIG operation mode, i.e., having a double fed injection to the grid.

Otherwise, the speed of the DFIG generator may, in block 603 be monitored. If the generator speed is above or equal to a minimum DFIG speed, e.g., 1000 rpm for a generator of 1500 rpm of synchronous speed, the at least one thyristor may, in block 602, is set in full wave mode.

Upon detection of a generator speed below a minimum DFIG speed, the duty cycle of the at least one thyristor may, in block 604, be changed up to the rotor voltage is within the converter limits. Therefore, the wind power facility may generate despite a low wind speed condition may, thus be more efficient.

In some embodiments, in case the SNBC harmonic emission is above the level imposed by the grid operator, then, the SNBC harmonic(s) may, in block 605, be damped e.g., by an active harmonic filter of the GSC. Thus, the harmonics generated by the at least one thyristor may therefore be damped.

Figure 7:
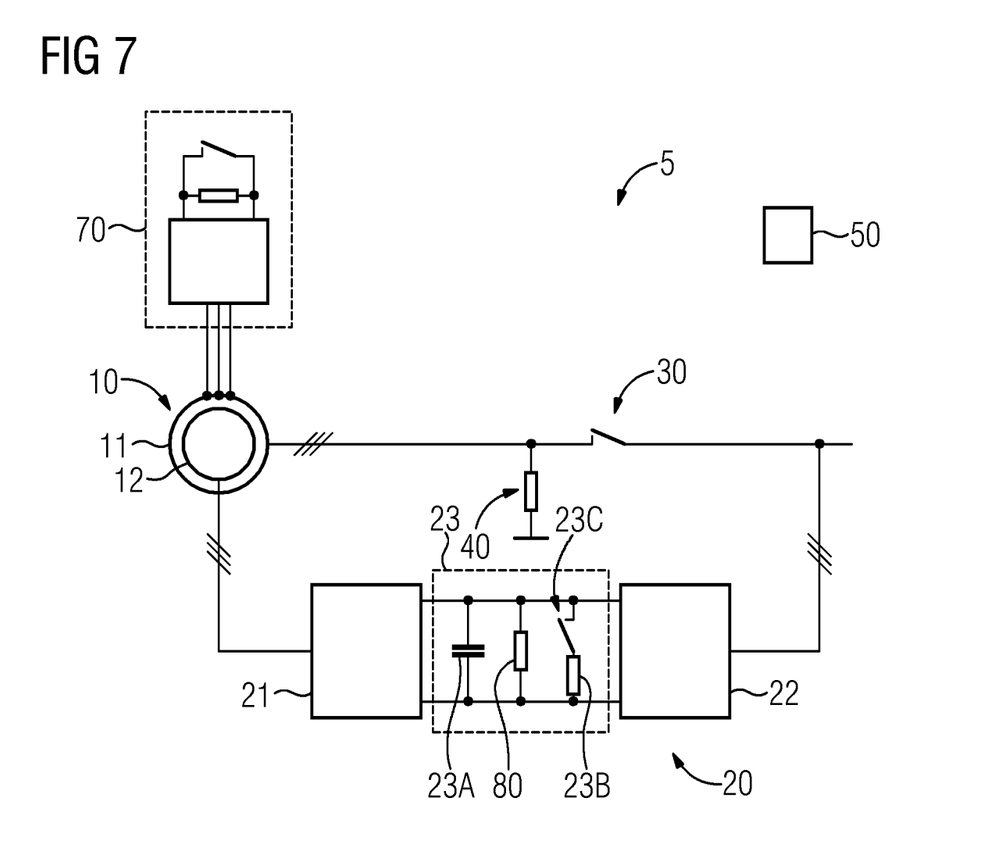
FIG. 7 schematically illustrates a DFIG wind power facility according to an example.

FIG. 7 shows a DFIG wind power facility 5. The DFIG wind power facility 5 may be configured to operate during grid faults such as grid loss, voltage dip, voltage drop, Low Voltage Ride Through (LVRT), etc.

The DFIG wind power facility 5 may comprise all the features of the DFIG wind power facility 1 according to any of the disclosed examples, i.e., a DFIG generator 10 comprising a rotor 12 and a stator 11, a converter 20 comprising a Machine Side Converter (MSC) 21, a Grid Side Converter (GSC) 22 and a DC link 23, a control system 50, a short-circuit controlled switch 40 and at least a SNBC 70 coupled to the stator.

The DFIG wind power facility 5 may further comprise an Energy Storage System (ESS) 80 in the DC link 23. Such ESS 80 may be coupled directly to the DC link. In an example, the ESS 80 may be arranged in parallel to the DC link capacitor 23A.

Figure 8:
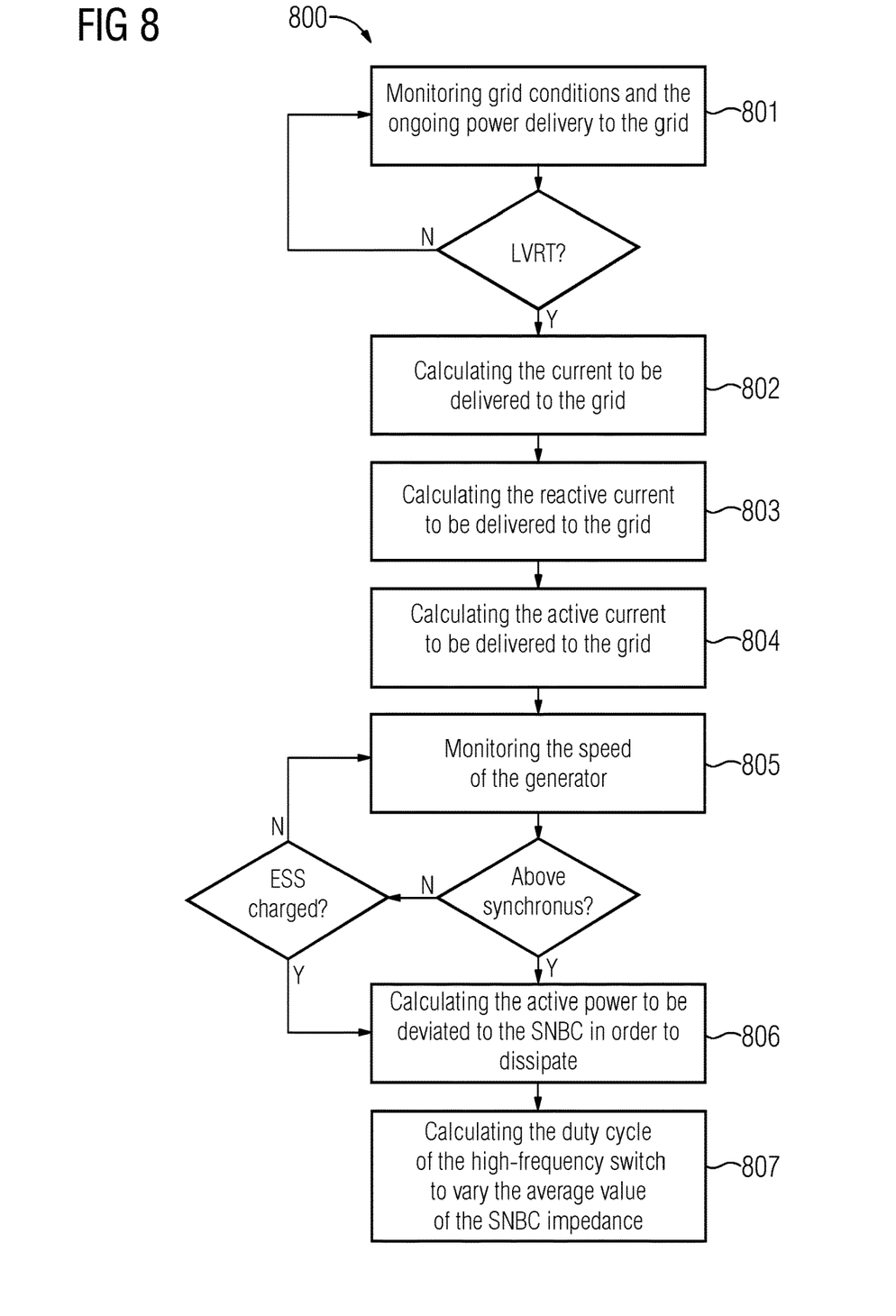
FIG. 8 schematically illustrates a flow diagram of a method for operating a DFIG wind power facility during LVRT according to an example.

FIG. 8 depicts a flow chart of a method 800 for operating a DFIG wind power facility 5 according to any of the disclosed examples during LVRT condition. Firstly, the grid connection and the ongoing power delivery to the grid may, in block 801, be monitored. Such monitoring may be carried out at the common coupling point by e.g., converter grid voltage controller or any other suitable device. In the event of a Low Voltage Ride Through (LVRT) is detected, the current to be delivered to the grid may, in block 802, be calculated. The current to be delivered to the grid may depending on the depth of the ongoing LVRT.

On the contrary, in the event no LVRT is detected, the grid conditions may continue being monitored.

The reactive current to be delivered may, in block 803, be calculated. Then, the active current to be delivered may, in block 804, be calculated.

The generator speed may, in block 805, be measured. Upon measuring a speed above synchronous speed, the active power to be deviated to the SNBC i.e., to be dissipated by the impedance may, in block 806, be calculated. That is, if the amount of power generated by the wind power facility exceeds the amount the grid may receive, a portion of the generated amount may be dissipated at the impedance of the SNBC. In an example, the active power to be deviated to the SNBC may be calculated as the difference between the active power generated before the LVRT detection and the active power to be delivered to the grid.

In the event the generator speed is not above synchronous speed, availability of the ESS may be checked i.e., check whether the ESS is charged. In case the wind power facility comprises charged ESS, the method may continue in block 806. Otherwise, the generator speed may, in block 805, be monitored.

Then, the duty cycle of the high-frequency switch may, in block 807, be calculated to vary the average value of the SNBC impedance and effectively dissipated the "extra" or the surplus active power. By being able to vary the average value of the impedance the SNBC may be adapted to the ongoing LVRT and its value and may effectively dissipate the required amount of active power.

The use of an ESS enables the wind power facility to operate during a LVRT below synchronous speed which allows improving the LVRT events along all the power curve of the wind power facility.

Figure 9:
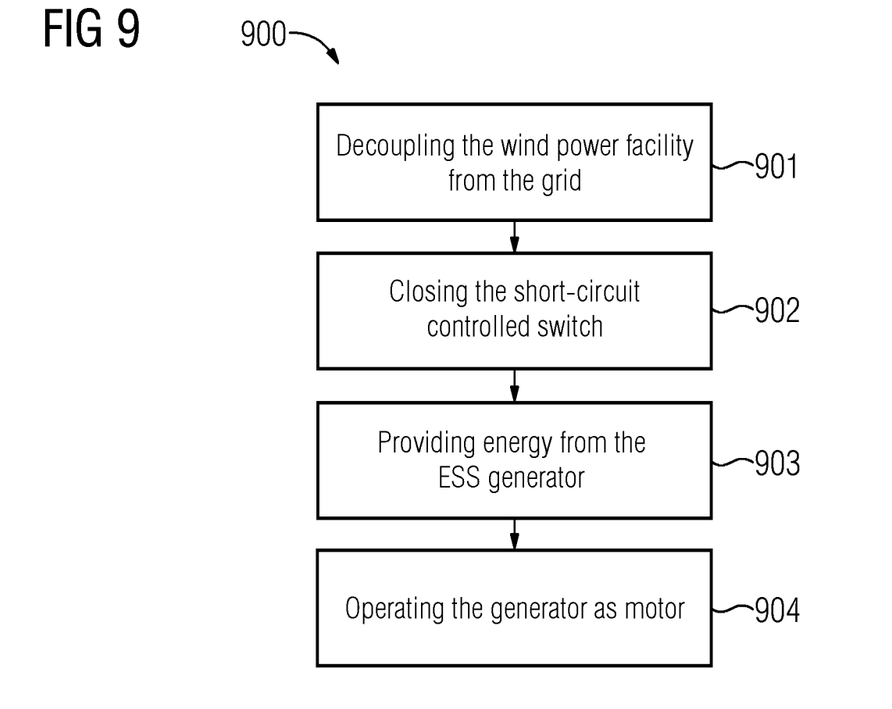
FIG. 9 schematically illustrates a flow diagram of a method for operating a DFIG wind power facility as motor according to an example.

FIG. 9 depicts a flow chart of a method 900 to operate a DFIG wind power facility 5 according to any of the disclosed examples as a motor.

Firstly, the wind power facility may, in block 901, decoupled from the grid. Then, the short-circuit controlled switch may, in block 902, be closed and thus, the stator may be short-circuited thereby enabling the current flow through the stator. The high frequency switch of the SNBC may be closed.

Energy from the Energy Storage System (ESS) may then, in block 903, be provided to the generator in order to energize it and enable it to function as motor. The ESS may be pre-charged or may be charged prior to a grid loss e.g., during the normal operation of the wind power facility.

The DFIG wind power facility may, in block 904, operate the generator as motor wherein the Machine Side Converter may supply the energy, i.e., similarly to a motor drive.

By being able to implement method 900, the wind power facility may, in absence of grid or in grid loss condition, enable maintenance tasks or may aid the wind power facility erection operation as the generator may function as motor independently from external influences such as wind condition or presence of grid.

Figure 10:
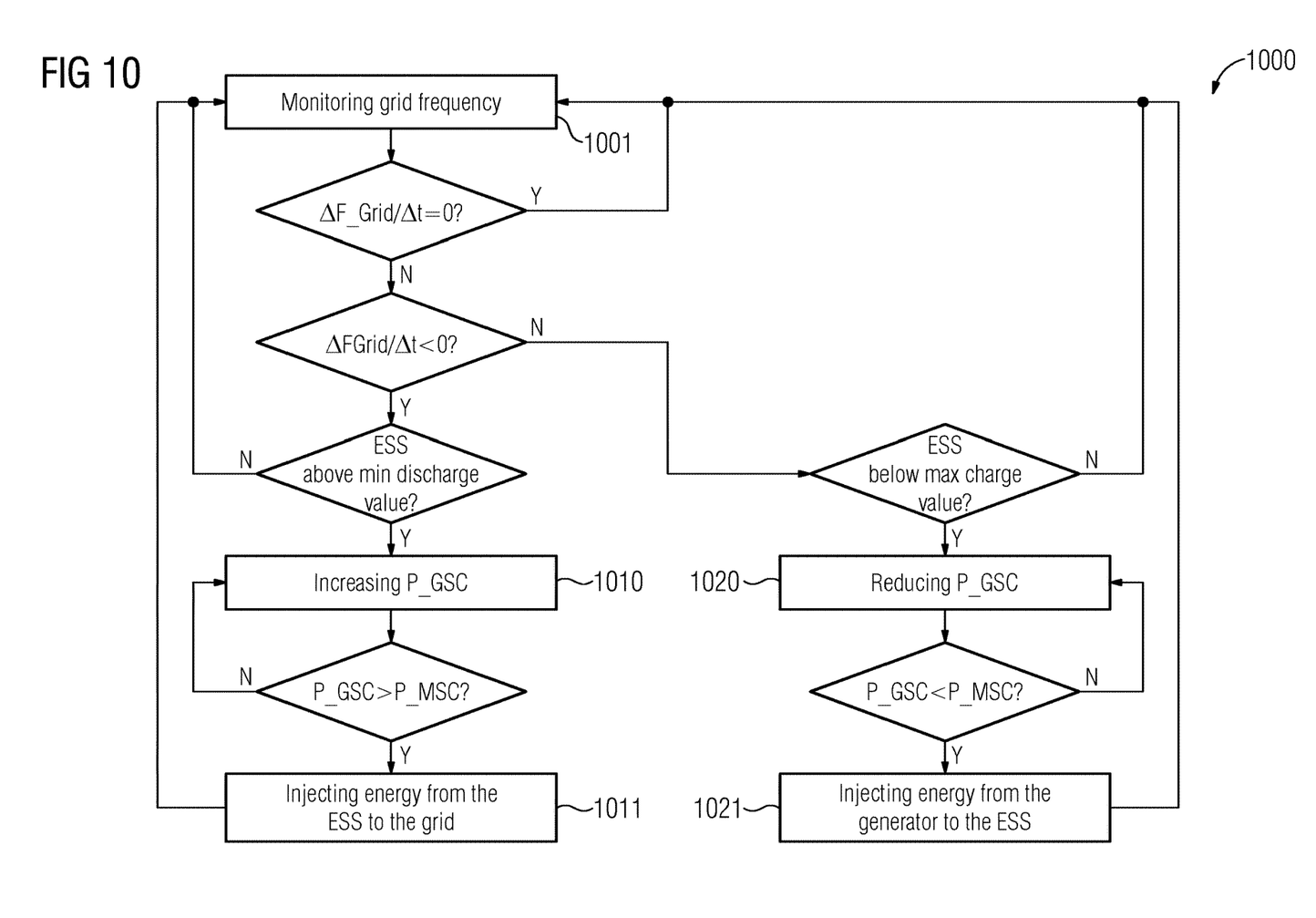
FIG. 10 schematically illustrates a flow diagram of a method for operating a DFIG wind power facility under constant torque, according to an example.

FIG. 10 depicts a flow chart of a method 1000 for operating a wind turbine facility under constant torque. In embodiments, the method may be implemented by a control system on a wind power facility comprising an ESS according to any of the disclosed examples.

Firstly, the grid frequency may, in block 1001, be monitored. Monitoring the grid frequency may comprise measuring a grid frequency value e.g., at predetermined time intervals. The stability of grid frequency may then be checked e.g., by detecting variations of the grid frequency, in order to detect grid frequency events.

In an example, the grid variation may be detected by calculating the ratio of frequency variation ($\Delta F\_Grid$) to time variation ($\Delta t$). In other examples, the grid frequency variations may be monitored by calculating the derivative of the grid frequency with respect to time ($dF\_Grid/dt$).

In the event such grid frequency to time ratio ($\Delta F\_Grid/\Delta t$) is zero or close to zero, for instance bellow a threshold imposed by the grid operator e.g., below 0.1 Hz/s: the controller may stablish that no grid frequency event occurred i.e., the grid frequency remained constant. Therefore, the grid frequency may continue being monitored.

Upon detecting a grid frequency event, i.e., a grid frequency variation, for example in the event the frequency variation to time variation ratio ($\Delta F\_Grid/\Delta t$) in non-zero value (or non-close-to-zero value) e.g., above a threshold imposed by the grid operator e.g., below 0.1 Hz/s: the sign of such ratio may be checked. That is, in case the grid frequency to time ratio ($\Delta F\_Grid/\Delta t$) is negative, the grid frequency decreased as result of the grid frequency event, thus, in order to compensate for the change without changing the operation of the wind power facility energy may be injected to the grid. On the contrary, in case the ($\Delta F\_Grid/\Delta t$) is positive, the grid frequency event increased the grid frequency, and therefore, to compensate for the change while unaltering the functioning of the wind power facility or at least the generator, part of the generated energy may prevent from being injected to the grid.

In case the grid frequency variation is negative, the controller may check whether the capacity of the ESS is above a minimum discharge value. The minimum discharge value may be about a 20-40% of the total ESS capacity, around a 30% of the total ESS capacity. If the capacity of the ESS is not above the minimum discharge value, the grid frequency may be monitored. Otherwise, if the ESS is above the minimum discharge value, the power of the GSC (P_GSC) may, in block 810, be increased e.g., by sending a control signal from the control system providing a new reference power.

The power of the GSC may be increased until it is greater than the power of MSC (P_MSC). Once the power of the GSC is greater than the MSC power, energy from the ESS may, in block 1011, be injected to the grid.

Therefore, the wind power facility may continue operating in the maximum power operation track facilitating the recovery in case of grid (frequency) events. The wind power facility may thus be more effective independently of the wind speed conditions when facing grid frequency events. The use of an ESS prevents increasing the wind power facility power as it may function as an energy source.

On the contrary, if the grid frequency variation is positive, the controller may check whether the capacity of the ESS is below a maximum charge value. The maximum charge value may be about 60-80% of the total ESS capacity, around 70% of the total ESS capacity. If the capacity of the ESS is above the maximum charge value, the grid frequency may be monitored. Otherwise, if the ESS is below the maximum charge value, the power of the GSC (P_GSC) may, in block 1020, be reduced e.g., by sending a control signal from the control system providing a new reference power.

The power of the GSC may be reduced until it is lower than the power of MSC (P_MSC). Once the power of the GSC is lower than the MSC power, the energy from the generator may, in block 1021, be injected to the ESS thereby absorbing energy to charge the ESS and preventing injecting it to the grid.

Therefore, the wind power facility may continue operating in the maximum power operation track facilitating the recovery in case of grid (frequency) events. The wind power facility may thus be more effective independently of the wind speed conditions when facing grid frequency events. The use of an ESS prevents reducing the wind power facility power as it may function as an energy source.

Thus, by using the ESS, in case of a grid frequency event which either increases or decreases the grid frequency, the generator of the wind power facility may be operated at constant torque and therefore, an optimal rotor speed may be maintained. Thus, the wind power facility may be able to extract the maximum aerodynamic power in function of the wind speed and pitch angle during the grid frequency.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

CLAUSES

For reasons of completeness, various aspects of embodiments of the invention are set out in the following clauses:

Clause 1. A method for operating a DFIG wind power facility during LVRT condition, the DFIG wind power facility comprising,
a Doubly-Fed Induction Generator (DFIG) comprising a rotor and a stator, wherein the stator comprises at least one three-phase winding;
a control system configured to manage the operation of the DFIG wind power facility; an electric converter comprising a Machine Side Converter (MSC), a Grid Side Converter (GSC) and a DC link connected therebetween;
a short-circuit controlled switch configured to selectively short-circuit the stator thereby allowing the current to flow through the stator upon decoupling the grid from the stator; and
a Stator Neutral Brake Chopper (SNBC) coupled to the stator, wherein the SNBC comprises a three-phase rectifier comprising three inputs, wherein each input corresponds to a phase; an impedance and an active high-frequency switch configured to vary the average value of the impedance by adjusting its duty cycle; wherein each of the three inputs of the rectifier is connected to a phase of the at least one three-phase winding of the stator; wherein the phases of the at least one stator three-phase winding are connected to grid at one end and to the SNBC at the other end; and
wherein, during a fault, the at least one stator three-phase winding is configured to remain connected to the grid, the method comprising:
monitoring the grid connection;
calculating the current to be delivered to the grid, upon detection of a Low Voltage Ride Through;
calculating the reactive current to be delivered to the grid;
calculating the active current to be delivered to the grid;
monitoring the speed of the generator;
calculating the active power to be deviated to the SNBC in order to be dissipated, upon measuring a generator speed above synchronous speed; and
calculating the duty cycle of the high-frequency switch to vary the average value of the SNBC impedance.

Clause 2. A method for operating a DFIG wind power facility under low wind speed condition, the DFIG wind power facility comprising,
a Doubly-Fed Induction Generator (DFIG) comprising a rotor and a stator, wherein the stator comprises at least one three-phase winding;
a control system configured to manage the operation of the DFIG wind power facility;
an electric converter comprising a Machine Side Converter (MSC), a Grid Side Converter (GSC) and a DC link connected therebetween;
a short-circuit controlled switch configured to selectively short-circuit the stator thereby allowing the current to flow through the stator upon decoupling the grid from the stator; and
a Stator Neutral Brake Chopper (SNBC) coupled to the stator, wherein the SNBC comprises a three-phase rectifier comprising three inputs, wherein each input corresponds to a phase; an impedance and an active high-frequency switch configured to vary the average value of the impedance by adjusting its duty cycle; wherein each of the three inputs of the rectifier is connected to a phase of the at least one three-phase winding of the stator, the three-phase rectifier comprising at least one thyristor;
wherein the phases of the at least one stator three-phase winding are connected to grid at one end and to the SNBC at the other end; and
wherein, during a fault, the at least one stator three-phase winding is configured to remain connected to the grid, the method comprising:
monitoring wind speed;

monitoring the speed of the generator upon measuring a low wind speed condition; and changing the duty cycle of the at least one thyristor up to rotor voltage inside of the converter limits.

Clause 3. In embodiments, the method according to clause 2, further comprising:
damping the SNBC harmonics.

Clause 4. A method for operating a DFIG wind power facility during a LVRT condition, the DFIG wind power facility comprising,
a Doubly-Fed Induction Generator (DFIG) comprising a rotor and a stator, wherein the stator comprises at least one three-phase winding;
a control system configured to manage the operation of the DFIG wind power facility;
an electric converter comprising a Machine Side Converter (MSC), a Grid Side Converter (GSC) and a DC link connected therebetween;
a short-circuit controlled switch configured to selectively short-circuit the stator thereby allowing the current to flow through the stator upon decoupling the grid from the stator;
a Stator Neutral Brake Chopper (SNBC) coupled to the stator, wherein the SNBC comprises a three-phase rectifier comprising three inputs, wherein each input corresponds to a phase: an impedance and an active high-frequency switch configured to vary the average value of the impedance by adjusting its duty cycle: wherein each of the three inputs of the rectifier is connected to a phase of the at least one three-phase winding of the stator; and
an Energy Storage System (ESS) in the DC link,
wherein the phases of the at least one stator three-phase winding are connected to grid at
one end and to the SNBC at the other end; and
wherein, during a fault, the at least one stator three-phase winding is configured to remain connected to the grid
the method comprising:
monitoring grid conditions and the ongoing power delivery to the grid;
calculating the current to be delivered to the grid upon detection of a LVRT condition;
calculating the reactive current to be delivered to the grid;
calculating the active current to be delivered to the grid;
monitoring the speed of the generator;
calculating the active power to be deviated to the SNBC in order to dissipate upon measuring a generator speed above synchronous speed; and
calculating the duty cycle of the high-frequency switch to vary the average value of the SNBC impedance.

Clause 5. In embodiments, the method according to clause 4, further comprising, prior to calculating the active power to be deviated to the SNBC:
checking whether the ESS is charged, in the event the generator speed is below synchronous speed.

Clause 6. A method for operating a DFIG wind power facility as motor, the DFIG wind power facility comprising,
a Doubly-Fed Induction Generator (DFIG) comprising a rotor and a stator, wherein the stator comprises at least one three-phase winding;
a control system configured to manage the operation of the DFIG wind power facility; an electric converter comprising a Machine Side Converter (MSC), a Grid Side Converter (GSC) and a DC link connected therebetween;
a short-circuit controlled switch configured to selectively short-circuit the stator thereby allowing the current to flow through the stator upon decoupling the grid from the stator;
a Stator Neutral Brake Chopper (SNBC) coupled to the stator, wherein the SNBC comprises a three-phase rectifier comprising three inputs, wherein each input corresponds
to a phase; an impedance and an active high-frequency switch configured to vary the average value of the impedance by adjusting its duty cycle; wherein each of the three inputs of the rectifier is connected to a phase of the at least one three-phase winding of the stator; and
an Energy Storage System (ESS) in the DC link,
wherein the phases of the at least one stator three-phase winding are connected to grid at one end and to the SNBC at the other end; and
wherein, during a fault, the at least one stator three-phase winding is configured to remain connected to the grid,
the method comprising:
decoupling the wind power facility from the grid;
closing the short-circuit controlled switch;
providing energy from the ESS to the generator; and
operating the generator as motor.

Clause 7. A method for operating wind power facility during frequency grid events, the wind power facility comprising:
a Doubly-Fed Induction Generator (DFIG) comprising a rotor and a stator, wherein the stator comprises at least one three-phase winding;
a control system configured to manage the operation of the DFIG wind power facility;
an electric converter comprising a Machine Side Converter (MSC), a Grid Side Converter (GSC) and a DC link connected therebetween;
a stator-grid switch for selectively coupling/decoupling the stator and the grid;
a short-circuit controlled switch configured to selectively short-circuit the stator thereby allowing the current to flow through the stator upon decoupling the grid from the stator;
a Stator Neutral Brake Chopper (SNBC) coupled to the stator, wherein the SNBC comprises a three-phase rectifier comprising three inputs, wherein each input corresponds to a phase; an impedance and an active high-frequency switch configured to vary the average value of the impedance by adjusting its duty cycle; wherein each of the three inputs of the rectifier is connected to a phase of the at least one three-phase winding of the stator; and
an Energy Storage System (ESS) in the DC link:
wherein the method comprises:
monitoring the grid frequency so that a grid frequency value is measured; and
adapting the power of the GSC by providing, via the control system, a GSC power reference, and wherein the GSC power reference depends on the variation of the grid frequency value thereby controlling the operation of the ESS.

Clause 8. In embodiments, the method according to clause 7, wherein, in case the grid frequency decreases with respect to a previous measured grid frequency value, the method further comprises:
checking whether the capacity of the ESS is above a minimum predefined discharge value.

Clause 9. In embodiments, the method according to clause 8, wherein adapting the power of the GSC comprises increasing the power of the GSC until it is greater than the power of the MSC.

Clause 10. In embodiments, the method according to clause 8 or 9, wherein the method further comprises:
providing energy to the grid from the ESS.

Clause 11. In embodiments, the method according to clause 7, in case the grid frequency increases with respect to a previous measured grid frequency value, the method further comprises:
checking whether the capacity of the ESS is below a maximum predefined charge value.

Clause 12. In embodiments, the method according to clause 11, wherein adapting the power of the GSC comprises reducing the power of the GSC until it is lower than the power of the MSC.

Clause 13. In embodiments, the method according to clause 11 or 12, wherein the method further comprises:
providing energy to the ESS from the generator.

Clause 14. In embodiments, the method according to any of clauses 7 to 13, wherein the wind power facility further comprises a short-circuit controlled switch configured to selectively short-circuit the stator thereby allowing the current to flow through the stator upon decoupling the grid from the stator, the short-circuit controlled switch comprising at least one controllable switch.

Clause 15. In embodiments, the method according to clause 14, wherein the short-circuit controlled switch further comprises at least an impedance.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A DFIG wind power facility configured to operate during grid faults, the DFIG wind power facility comprising:
a Doubly-Fed Induction Generator (DFIG) comprising a rotor and a stator, wherein the stator comprises at least one three-phase winding;
a control system configured to manage an operation of the DFIG wind power facility;
an electric converter comprising a Machine Side Converter (MSC), a Grid Side Converter (GSC) and a DC link connected therebetween;
a short-circuit controlled switch configured to selectively short-circuit the stator thereby allowing a current to flow through the stator upon decoupling the grid from the stator; and
a Stator Neutral Brake Chopper (SNBC) coupled to the stator, wherein the SNBC comprises a three-phase rectifier comprising three inputs, wherein each input corresponds to a phase; and
an impedance and an active high-frequency switch configured to vary an average value of the impedance by adjusting a duty cycle;
wherein each of the three inputs of the rectifier is connected to a phase of the at least one three-phase winding of the stator;
wherein the phases of the at least one stator three-phase winding are connected to the grid at one end and to the SNBC at the other end;
wherein, during a fault, the at least one stator three-phase winding is configured to remain connected to the grid.

2. The DFIG wind power facility according to claim 1, wherein the short-circuit controlled switch is an electromechanical switch or an electronic switch.

3. The DFIG wind power facility according to claim 1, wherein the three-phase rectifier comprises at least one thyristor.

4. The DFIG wind power facility according to claim 3, wherein the three-phase rectifier comprises a plurality of thyristors connected in series and/or in parallel.

5. The DFIG wind power facility according to claim 1, wherein the three-phase rectifier comprises at least a diode.

6. The DFIG wind power facility according to claim 5, wherein the three-phase rectifier comprises a plurality of diodes connected in series and/or in parallel.

7. The DFIG wind power facility according to claim 5, further comprising a stator-grid switch for selectively coupling/decoupling the stator and the grid.

8. The DFIG wind power facility according to claim 1, further comprising two or more SNBCs.

9. The DFIG wind power facility according to claim 8, wherein the two or more SNBCs are connected in parallel to the at least one winding of the stator.

10. The DFIG wind power facility according to claim 8, wherein the stator comprises a plurality of three-phase windings and the two or more SNBCs may be connected to a different three-phase winding of the stator or a combination thereof.

11. The DFIG wind power facility according to claim 1, further comprising an Energy Storage System in the DC link.

12. The DFIG wind power facility according to claim 11, wherein the ESS comprises a plurality of batteries in series and/or in parallel.

13. The DFIG wind power facility according to claim 11, wherein the ESS is connected parallel to the DC link capacitor.

14. A method for operating the wind power facility according to claim 1, during grid loss, wherein the DFIG wind power facility further comprises a plurality of blades, the method comprising:
monitoring a grid connection,
closing the short-circuit controlled switch and decoupling at least the stator from the grid upon detecting a grid loss;
increasing a pitch of the plurality of blades for gradually reducing a rotational speed of the rotor;
opening the active high-frequency switch of the at least one SNBC;
measuring the rotational speed of the rotor;
injecting a predetermined DC or AC current in the rotor for adapting a rotor frequency; and
opening the short-circuit controlled switch upon measuring the rotational speed of the rotor below a predetermined shutdown speed thereby allowing a controlled shutting down of the wind power facility.

* * * * *